United States Patent
Inada et al.

Patent Number: 5,733,654
Date of Patent: Mar. 31, 1998

[54] POLYAMIDE FIBER CORDS FOR RUBBER REINFORCEMENT

[75] Inventors: Norio Inada; Hiroto Yoshida, both of Kodaira, Japan

[73] Assignee: Bridgestone Corporation, Tokyo, Japan

[21] Appl. No.: 262,383

[22] Filed: Jun. 20, 1994

Related U.S. Application Data

[63] Continuation of Ser. No. 850,989, Mar. 12, 1992, abandoned.

[30] Foreign Application Priority Data

Mar. 13, 1991 [JP] Japan .................. 3-072123

[51] Int. Cl.$^6$ ...................................... B32B 27/34
[52] U.S. Cl. .................. 428/395; 428/364; 428/375; 428/376
[58] Field of Search .................... 428/375, 395, 428/376

[56] References Cited

U.S. PATENT DOCUMENTS

| | | | |
|---|---|---|---|
| 2,615,826 | 10/1952 | Mallory et al. | 428/395 |
| 2,652,353 | 9/1953 | Wilson | 428/395 |
| 3,304,222 | 2/1967 | Wilken | 428/395 |
| 3,549,481 | 12/1970 | Cesare et al. | 428/395 |
| 3,578,613 | 5/1971 | Tai | 428/395 |
| 3,956,566 | 5/1976 | van Gils et al. | 428/395 |
| 3,962,011 | 6/1976 | van Gils | 428/395 |
| 3,964,950 | 6/1976 | Boles | 428/395 |
| 4,040,999 | 8/1977 | Kalafus et al. | 428/395 |
| 4,048,362 | 9/1977 | Moring et al. | 428/395 |
| 4,137,358 | 1/1979 | Hartz | 428/395 |
| 4,251,409 | 2/1981 | Neubert | 428/395 |
| 4,259,404 | 3/1981 | van Gils | 428/395 |
| 4,263,190 | 4/1981 | Zavisza | 428/395 |
| 4,300,972 | 11/1981 | Neubert | 428/395 |
| 4,409,055 | 10/1983 | Elmer | 428/395 |
| 4,557,967 | 12/1985 | Willemsen et al. | 428/395 |
| 4,756,925 | 7/1988 | Furukawa et al. | 428/395 |
| 4,900,496 | 2/1990 | Andrews, Jr. | 428/395 |
| 4,920,003 | 4/1990 | Day | 428/395 |
| 4,959,267 | 9/1990 | Ng et al. | 428/395 |
| 5,096,778 | 3/1992 | Andrews, Jr. | 428/395 |

FOREIGN PATENT DOCUMENTS

| | | | |
|---|---|---|---|
| 0430054 | 6/1991 | European Pat. Off. | 428/395 |
| 50-124973 | 10/1975 | Japan . | |
| 0053779 | 3/1984 | Japan | 428/395 |
| 60-013869 | 1/1985 | Japan . | |
| 60-071238 | 4/1985 | Japan | 428/395 |
| 60-071240 | 4/1985 | Japan . | |
| 63-175179 | 7/1988 | Japan . | |

*Primary Examiner*—Richard Weisberger
*Assistant Examiner*—J. M. Gray
*Attorney, Agent, or Firm*—Sughrue, Mion, Zinn, Macpeak & Seas, PLLC

[57] ABSTRACT

Polyamide fiber cords for rubber reinforcement are produced by subjecting cords having a denier per filament of 1.5–10 to RFL adhesive solution having a swelling ratio in DMSO of 122–340% at an impregnated state in cord, embedding the thus treated cords in rubber and vulcanizing them, and have a cord strength in rubber of not less than 8.0 g/d. They provide excellent fatigue resistance under repetitive compressive strain without lowering strength in the dipping and vulcanization.

4 Claims, 2 Drawing Sheets

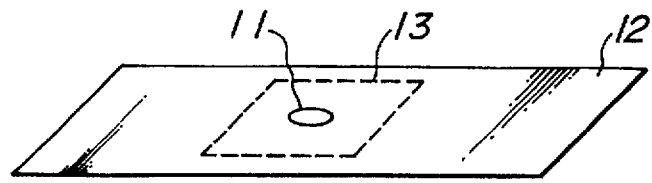
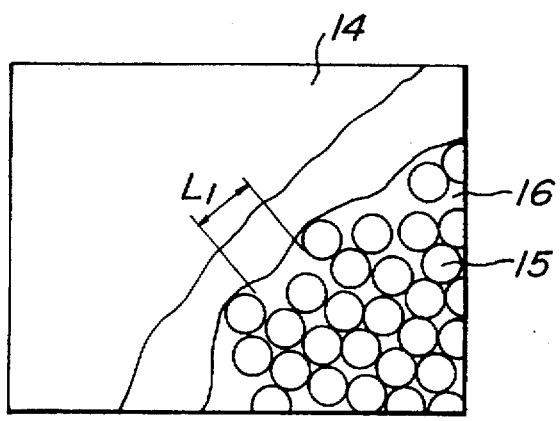
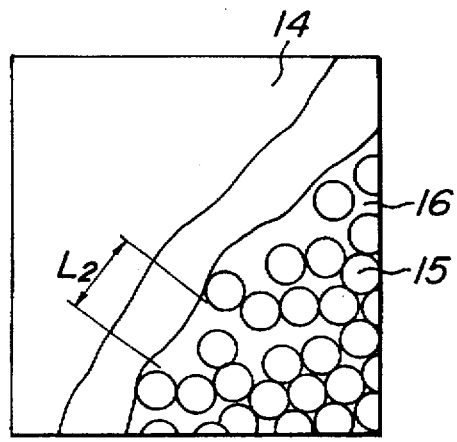

1

POLYAMIDE FIBER CORDS FOR RUBBER REINFORCEMENT

This is a Continuation of application Ser. No. 07/850,989 filed Mar. 12, 1992, now abandoned.

BACKGROUND OF THE INVENTION

1. Field of the Invention

This invention relates to polyamide fiber cords for rubber reinforcement having a high tenacity.

2. Disclosure of the Related Art

Polyamide fiber cords are widely used as a reinforcing material for industrial rubber articles such as large size tires for trucks, buses, construction vehicles and airplanes, conveyor belts, hoses, air springs and the like because they have excellent strength, durability and heat resistance among various reinforcing cord materials for rubber articles including tires.

On the other hand, there is a strong demand to decrease the amount of the reinforcing material used by decreasing the number of reinforcing material layers to be laminated or the end count of cords, or thinning the size of the cord from the viewpoint of weight reduction of the tire, low fuel consumption, resource-saving, improvement of productivity and the like.

In order to decrease the amount of the reinforcing material used while maintaining the total strength of the rubber composite body, fibers having a higher tenacity are required. Recently, polyamide fibers having a tenacity considerably higher than those which are conventional have been developed and disclosed, for example, in Japanese Patent laid open No. 61-70008.

However, when such a super-high tenacity polyamide fiber cord is subjected to a so-called "dip treating step" in which the cords are immersed in an adhesive solution required for the adhesion between fiber and rubber, dried and heated at a high temperature near the melting point of the fiber, the strength of the cord largely decreases to cause problems, as disclosed in Japanese patent laid open No. 63-17517 and No. 63-203841.

In these publications, it has been proposed to prevent the decrease of the cord strength by restricting tension of the cord to not less than 0.5 g/d when immersed in the adhesive solution, or by subjecting the cord to a pretreatment at a high temperature above 100° C. to prevent impregnating the inside of the cord with the adhesive solution.

Furthermore, there are other proposed techniques, similar to the above one, disclosed in Japanese Patent laid open No. 60-71239 and No. 60-104580, such as the technique of subjecting the cord to a heat treatment under tension prior to the treatment with the adhesive, a technique of applying an adhesive under an elongation of not less than 3% and the like.

Since the amount of the adhesive bonded to the cord is small in such a dipping process, the adhesion force between rubber and fiber lowers. A technique of improving the adhesion property by specifying the solid content in a solution of resorcinol-formaldehyde-rubber latex (RFL) adhesive, the ratio of total weight of resorcinol and formaldehyde to a weight of latex and the ratio of a weight of vinylpyridine latex to total weight of vinylpyridiene latex and styrene-butadiene latex in addition to the relationship between temperature and tension at the heat treating step under tension prior to the immersion in the adhesive solution is disclosed in Japanese Patent laid open No. 1-174627 and No. 1-174628.

Moreover, it is known that the strength of the high tenacity polyamide fiber is decreased even in a vulcanization step at a cord embedded state in rubber after the dip treatment step as disclosed in Japanese Patent laid open No. 2-91276, which is a problem to be solved.

Further, the inventors have found another serious problem. That is, before and in the immersion of the cords in the adhesive solution as in the conventional technique, when either heat or tension or both is applied at the heat treating step under tension, the decrease in strength at the dipping step is certainly prevented, but the fatigue resistance of the cord under repetitive compressive strain in rubber is poor. In this connection, the inventors have made various studies and found that the above problem mainly results from the fact that, since the adhesive solution is not impregnated into the inside of the cord, bare filaments constituting the cord are abraded with each other at the intersecting face of the layer twisted structure to cause fatigue.

SUMMARY OF THE INVENTION

It is, therefore, an object of the invention to simultaneously solve the above problems and to provide high tenacity polyamide fiber cords for rubber reinforcement having improved fatigue resistance under repetitive compressive strain without decreasing the strength in the dipping treatment and vulcanization.

The inventors have made further studies in order to simultaneously solve the above two serious problems.

At first, the adhesive solution is not impregnated in the inside of the cords subjected to the heat treatment under tension before the immersion of the adhesive solution as in the conventional technique, to avoid fatigue caused by abrading the bare filaments with each other at the intersecting face of the layer twisted structure through repetitive stretching and compression. Therefore, it is considered that in order to prevent the fatigue of the cord, it is necessary to sufficiently impregnate the adhesive into the inside of the cord through the immersion of the adhesive solution at a relaxed state as in the usual manner or under a very low tension without conducting the heat treatment under tension, whereby the surfaces of the filaments at the intersecting face are protected with the solid of the adhesive.

In this way, the second problem with the fatigue property is solved, but the natural phenomenon of decreasing the cord strength in the dipping treatment and vulcanization also appears as a problem.

Thus, the inventors have made studies with respect to the cause of the decrease in the cord strength, and found that, as disclosed in Japanese Patent laid open No. 63-175179, No. 63-203841, No. 60-71239 and No. 60-104580, the dipping solution impregnated into the inside the cord is dried and resinified in a high-temperature oven in the dipping treatment to close the filaments, whereby the degree of freedom in the filaments constituting the cord is restrained to obstruct uniform stress allotment of each filament at the cord stretching. Therefore the cord is broken at a strength lower than the strength inherent to the cord itself. Also, in order to produce higher tenacity polyamide fibers, the drawing is generally conducted at a high draw ratio, so that terminal modulus at breakage becomes high as the tenacity of the polyamide fiber is high, which is disadvantageous in the aligning property and uniform stress allotment of the filaments in the stretching of the cord and, therefore, the decrease of the strength is easily caused in the dipping treatment.

Now, the inventors have made various studies with respect to RFL adhesive solution impregnated in the polyamide fiber cord and found that the strength inherent to the high tenacity polyamide fiber could be developed without obstructing the uniform stress allotment in the stretching of the cord by restricting the swelling ratio in dimethyl sulfoxide (DMSO) of RFL dipped resin after the vulcanization to a certain range, even when the adhesive solution is sufficiently impregnated into the inside of the cord at the relaxed state or under a very low tension as in the usual manner. Thus, the invention has been accomplished.

According to a first aspect of the invention, there is the provision of a polyamide fiber cord for rubber reinforcement after being treated with a solution of resorcinol-formaldehyde-rubber latex adhesive (hereinafter referred to as RFL adhesive), embedded in rubber and vulcanized, in which a tenacity of the cord in a vulcanized rubber is not less than 8.0 g/d, a denier per filament is 1.5–10, and a swelling ratio X in DMSO of RFL adhesive impregnated in the cord is $122\% \leq X \leq 340\%$.

In a preferred embodiment, the swelling ratio X is $126\% \leq X \leq 270\%$, more particularly $130\% \leq X \leq 220\%$.

According to a second aspect of the invention, there is the provision of a polyamide fiber cord for rubber reinforcement after being treated with a solution of RFL adhesive, embedded in rubber and vulcanized, in which the solution of RFL adhesive satisfies all of the following relations:
$1/2.3 \leq R/F \leq 1/1.1$ (molar ratio)
$1/10 \leq RF/L \leq 1/4$ (weight ratio as solid content)
$0.05 \leq S \leq 0.8$ (% by weight)
$0 \leq A \leq 0.5$ (% by weight)
$0.05 \leq S+A \leq 0.8$ (% by weight)
$10 \leq C \leq 24$ (% by weight)
$10 \leq a \leq 80$ (% by weight)
$0 \leq b \leq 70$ (% by weight)
$20 \leq c \leq 60$ (% by weight)
wherein R/F is a molar ratio of resorcinol/formaldehyde, RF/L is a ratio of total amount of resorcinol and formaldehyde to total amount as solid content of rubber latex, S is a weight ratio of alkali metal hydroxide to total solid content of RFL adhesive solution, A is a weight ratio as $NH_4OH$ of an aqueous solution of $NH_3$ to total solid content of RFL adhesive solution, C is a weight ratio of total solid content of RFL adhesive solution, a is a weight ratio of solid content of vinylpyridine (VP) latex to total solid content of all of VP latex, styrene-butadiene rubber (SBR) latex and natural rubber (NR) and/or isoprene rubber (IR) latices, b is a weight ratio of solid content of SBR latex to the total solid content of all latices and c is a weight ratio of solid content of IR and/or NR latices to the total solid content of all latices, and a tenacity of the cord in a vulcanized rubber is not less than 8.0 g/d.

In a preferred embodiment, R/F, RF/L, S, A, S≤A and C are $1/2.0 \leq R/F \leq 1/1.3$ (more particularly, $1/1.8 \leq R/F \leq 1/1.5$), $1/8 \leq RF/L \leq 1/5$, $0.1 \leq S \leq 0.5$ (more particularly, $0.1 \leq S \leq 0.3$), $0 \leq A \leq 0.3$, $0.1 \leq S+A \leq 0.5$ and $14 \leq C \leq 22$, respectively. In another preferred embodiment, VP latex has a VP content of 5–20%. Further, the weight ratios of VP latex, SBR latex and IR and/or NR latices are preferably $30 \leq a \leq 60$, $10 \leq b \leq 50$ and $25 \leq c \leq 50$, respectively. Moreover, a part of the above latices may be replaced with the other latex component.

According to the invention, it has been found that when the solution of RFL adhesive used in the first aspect satisfies all relations defined in the second aspect, more preferable results are obtained. Moreover, the desired swelling ratio may be obtained by adding a substance obstructing resinification reaction such as $SiO_2$, boron compound or the like to the RFL adhesive solution.

BRIEF DESCRIPTION OF THE DRAWINGS

The invention will be described with reference to the accompanying drawings, wherein:

FIG. 3 is a perspective view of a specimen holder assembly;

FIG. 4 is a diagrammatical view of a specimen before the pouring of DMSO based on a microphotograph; and FIG. 5 is a diagrammatical view of a specimen after the pouring of DMSO based on a microphotograph.

DESCRIPTION OF THE PREFERRED EMBODIMENTS

Figure 1:
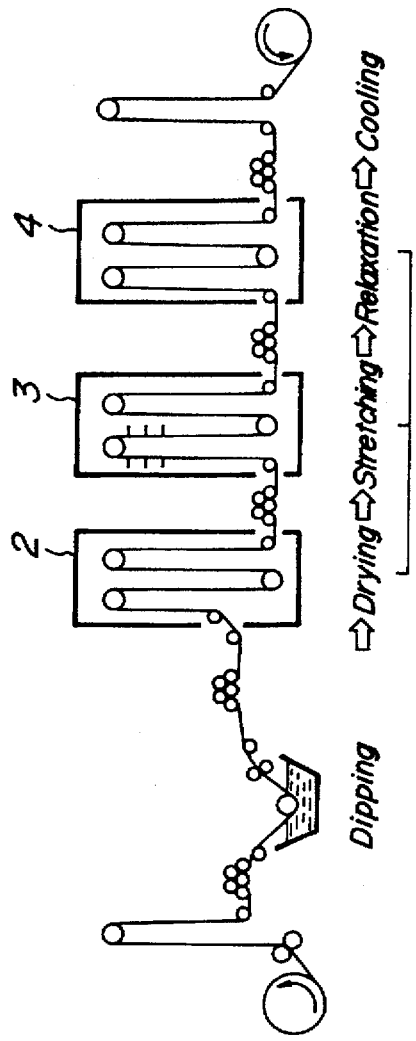
FIG. 1 is a flow chart illustrating an outline of a treatment with an adhesive.

According to the invention, when the polyamide fiber cords are used as a rubber reinforcement, the tenacity of the cord is not less than 8.0 g/d, preferably not less than 8.5 g/d, more particularly not less than 9.5 g/d for sufficiently attaining weight reduction, low fuel consumption, resorce-saving, cost reduction and high productivity and the like in the tire through, for example, the decrease of the laminating number as a reinforcing layer, the decrease of the end count, the reduction of the cord size or the like.

Furthermore, the denier per filament of the cord is 1.5–10, preferably 3–8. When the denier per filament is less than 1.5, the number of filaments constituting the cord increases and also the total surface area of the filaments is too large, so that the restraint and uniform stress allotment of each filament by adhesive after the drying and heating treatment increase to undesirably lower the strength in the dipping treatment. While, when it exceeds 10 denier, the uniform quenching of the filament is obstructed in the spinning, which becomes unfavorable in the stable production of high tenacity filament.

As the polyamide usable in the invention, mention may be made of aliphatic polyamides selected from nylon-6,6, nylon-6, nylon-4,6, nylon-6,10 and mixtures thereof. Preferably, the aliphatic polyamide containing not less than 80% by weight of nylon-6,6 or nylon-6 is used. The use of nylon-6,6 is most preferable from a view point of the heat resistance. Stabilizers consisting of a copper salt and other antioxidants are added to these fibers in order to provide a durability against heat, light, oxygen and the like.

When the swelling ratio of the RFL dipped resin according to the invention in DMSO is less than 122%, the network density of the resin is too dense and the resin itself becomes hard, and consequently the uniform stress allotment in the stretching of the cord is obstructed and, therefore the strength inherent to the high tenacity polyamide fiber can not sufficiently be developed.

On the other hand, when the swelling ratio is more than 340%, the network density of the resin is too rough and hence the sufficient adhesion force can not be obtained and also the operability is poor because the cords are too sticky before the vulcanization.

In the RFL adhesive solution according to the invention, when R/F is less than 1/2.3, the F amount is too large as compared with the R amount and the R-F crosslinking excessively proceeds and the network of the final RF resin after the heat treatment is too dense which makes the hardness of the RFL adhesive layer excessively hard, while when R/F exceeds 1/1.1, the F amount is too small as compared with the R amount and the R-F crosslinking is less and the strength of RFL layer becomes weak, making the adhesion to rubber insufficient and causing the surfaces of the cords to stick, which are unfavorable in the operability.

When RF/L exceeds 1/4, the RF amount is too large as compared with the L amount and hence the hardness of the RFL adhesive layer is too hard, while when it is less than 1/10, the RF amount is too small as compared with the L amount and hence the sufficient adhesion to rubber is not obtained.

Further, when S exceeds 0.8% by weight, the amount of alkali metal hydroxide as a catalyst for the reaction between F and R is excessive and hence the R-F crosslinking excessively proceeds and the network of the final RF resin after the heat treatment is too dense and hence the hardness of the RFL adhesive layer becomes too hard. When S is less than 0.05% by weight, the amount of the alkali metal hydroxide is too small and the adhesive solution is apt to be gelled and the stability is poor. As the alkali metal hydroxide, NaOH is usually preferable, but other alkali metal hydroxide such as KOH and the like may be used. And also, alkaline earth metal hydroxides may be used.

The adhesion property to rubber is slightly improved by adding a small amount of aqueous $NH_3$ solution. When A exceeds 0.5% by weight, or even when A is less than 0.5%, if S+A exceeds 0.8% by weight, the R-F crosslinking reaction excessively proceeds and the network of the RF resin after the heat treatment is too dense and hence the hardness of the RFL adhesive layer becomes excessive.

Moreover, when C is less than 10% by weight, the solid content of the adhesive can not be adhered to the cord in a sufficient amount required for the adhesion to rubber in the immersion with the adhesive, while when it exceeds 24% by weight, the solid content becomes too large and the RFL adhesive solution is apt to be gelled and becomes unstable.

With respect to the latex components in the solution, when a is less than 10% by weight, the sufficient adhesion to rubber is not obtained, while when it exceeds 80% by weight, the selectivity on rubber to be adhered is undesirably large and also the cost of RFL solution becomes too high.

When SBR latex is added as a latex component, the heat-resistant adhesion property is favorably improved, but when b exceeds 70% by weight, the adhesion property to rubber lowers.

As disclosed in Japanese Patent laid open No. 2-91276, when NR and/or IR latices are added in a proper amount, the decrease in the strength in the vulcanization can be suppressed. However, when c is less than 20% by weight, the effect of sufficiently suppressing the decrease of strength in the vulcanization is not obtained, while when c exceeds 60% by weight, the sufficient adhesion to rubber is not obtained.

When using novolac RF resin of acidic catalyst-precondensation type, R and F are condensed in a straight form, so that the R-F network of the final RF resin after the heat treatment is slightly rough and the RFL adhesive layer tends to be relatively soft. In this case, however, when all of the requirements such as the ratios of R, F and L, the amount of alkali metal hydroxide, amounts of latices, the percentages thereof and the like are satisfied, the precondensation type novolac RF resin may be used in the invention.

Moreover, when using the precondensation type novolac RF resin, problems such as sticking of the surfaces of the cords and the stability of the slightly poorer solution as compared with the usual resol system using the alkali catalyst may be caused. Therefore, the use of the usual resol system is preferable.

In the treatment with the adhesive, when the cord strength T in the immersion into the RFL solution is not less than 0.3 g/d, the inside of the cord is not sufficiently impregnated with the adhesive solution and the fatigue due to the abrasion contacting of filaments at the intersecting face of the layer twisted structure is caused. Preferably, T is not more than 0.2 g/d, more particularly not more than 0.1 g/d.

In the polyamide fiber cords treated with the adhesive and embedded in rubber according to the invention, the RFL adhesive layer is soft as compared with the conventional layer, so that the restraint of the filaments constituting the cord through the adhesive layer is less and the uniform stress allotment can be attained in the stretching of the cord and consequently the high strength inherent to the cord itself can be developed.

The following examples are given in illustration of the invention and are not intended as limitations thereof.

As a polyamide yarn to be tested, (i) the conventional nylon-6,6 fiber of 1890 d having a denier per filament of 6 and a tenacity of 9.5 g/d, (ii) high-tenacity nylon-6,6 fiber of 1890 d having a denier per filament of 6 and a tenacity of 10.2 g/d, (iii) super-high tenacity nylon-6,6 fiber of 1890 d having a denier per filament of 4 and a tenacity of 12.2 g/d, and (iv) super-high tenacity nylon-6 fiber of 1260 d having a denier per filament of 3 and a tenacity of 13.0 g/d were used.

Moreover, each of the yarns (i), (ii) and (iii) were twisted in the structure of 1890 d/2 at a twisting number of 32 turns/10 cm, while the yarns (iv) were twisted in the structure of 1260 d/2 at a twisting number of 39 turns/10 cm.

For the preparation of RFL adhesive solution used in the examples and comparative examples, resorcinol was first dissolved in a soft water, and then the aqueous NaOH solution and formaldehyde were added thereto, which was left to stand at room temperature for 6 hours to conduct aging. After the aqueous $NH_3$ solution was added, if necessary, latices were added and left to stand at room temperature for 24 hours to conduct aging. The resulting solution was used for the treatment with adhesive.

Figure 2:
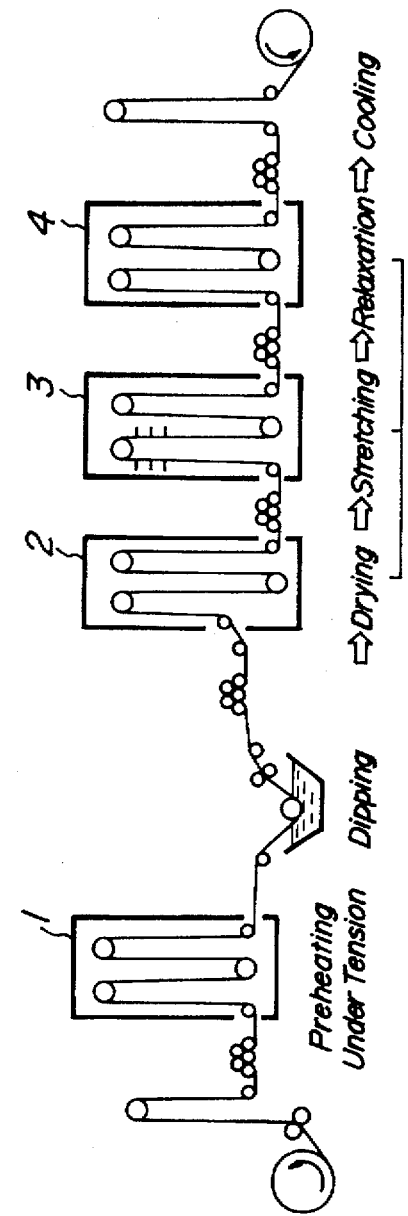
FIG. 2 is a flow chart illustrating an outline of a heat treatment of cord under tension before the treatment with adhesive.

An outline of the treatment with adhesive according to the invention is shown in FIG. 1. For comparison, an outline of the preheating treatment under tension before the immersion in the adhesive solution is shown in FIG. 2. In the preheating zone under tension 1 (only FIG. 2), drying zone 2, hot zone 3 and normalizing zone 4 of FIGS. 1 and 2, temperature, exposure time and tension of the cord were 190° C.×40 seconds×1.0 g/d, 130° C.×120 seconds×0.8 g/d, 235° C.×40 seconds×0.8 g/d and 230° C.×40 seconds×0.5 g/d in the case of the nylon-6,6 fiber cord and 160° C.×40 seconds×1.0 g/d, 130° C.×120 seconds×0.8 g/d, 200° C.×40 seconds×0.8 g/d and 195° C.×40 seconds×0.5 g/d in the case of the nylon-6 fiber cord.

The measurement of each of the properties is carried out as follows.

1) Swelling ratio

When the cord was taken out from the vulcanized rubber, the rubber was cut by a knife to form a guide without damaging the cord as far as possible and then the cord was taken out from the rubber. Thereafter the rubber was removed from the surface of the cord by means of scissors as far as possible. In the case of a tire, the cord was taken out from a center portion of the tire being stable in the strength. The cord taken out from the vulcanized rubber was embedded in epoxy resin having the following components at a mixing ratio by volume, which was cured in an oven at 80° C. for 6 hours.

| | |
|---|---|
| EPOK 812 (trade name, epoxy resin) | 11.5 |
| MNA (methylnadic acid anhydride) | 7.9 |
| DDSA (dodecenyl succinic anhydride) | 6.0 |
| DMP-30 (dimethyl aminomethyl phenol) | 0.19 |

Then, the cord embedded in the epoxy resin was cut at a thickness of 20 μm in a direction perpendicular to the axial direction of the cord by means of a microtome (made by Karl Zeiss AG) to form a cut sample 11. As shown in FIG. 3, the cut sample 11 was placed on a slide glass 12 and covered with a cover glass 13, which was observed and photographed by means of a reflection type fluorescent microscope (ORTHOPLANPOL, made by Lietz, ×200) having a wavelength of 355–425 nm. As shown in FIG. 4, the position of RFL dipped resin to be photographed was selected so that RFL dipped resin 16 was sufficiently impregnated at outermost layer of the fibers surrounded by the rubber layer 14 and always existent on at least a straight line connecting the filaments to each other within a range of 30–50 μm as a distance between filaments 15 of the outermost layer.

After the photographing, DMSO was poured between the slide glass 12 and the cover glass 13 at a temperature of 25° C. to start the swelling of the RFL dipped layer, and was left to stand for 30 minutes.

The photographing was again conducted at the same position of the RFL dipped layer before the swelling (see FIG. 5). When the distances between the filaments before the swelling and after the swelling were measured as L1 and L2, the swelling ratio X was determined according to the following equation:

*swelling ratio* $X=(L_2/L_1)^3 \times 100(\%)$

The swelling ratio X was an average of 10 swelling ratios X measured at 10 different positions.

2) Strength at breakage, tenacity

A tensile test was made by an Autograph made by Shimazu Seisakusho with respect to all of the yarn, raw cord, dipped cord and cord after vulcanization according to JIS L1017 to measure strength at breakage (kg).

Further, the tenacity (g/d) was calculated according to the following equation, in which official denier according to JIS L1017 was used as a cord denier in case of the fiber:

*Tenacity=strength at breakage/official denier*

With respect to the cord in the vulcanized rubber, 10 filaments were taken out from the sampled cord, and a filament diameter per filament was measured by an optical microscope, from which a sectional area of the filament was calculated assuming that the section of the filament was a circle. Then, a volume per unit length was measured from the above sectional area of the filament together with the total filament number determined by the observation of the cord section, which was converted into weight (denier) per unit length using a density ρ=1.14 in case of nylon-6 and nylon-6,6 to determine an estimated denier and then the tenacity was calculated according to the following equation:

*Tenacity=strength at breakage/estimated denier*

3) Adhesion force

The cords after the treatment with adhesive were embedded in an unvulcanized rubber composition having a compounding recipe as shown in Table 1, which was vulcanized at 153° C. for 20 minutes. Then, the cords were peeled off from the vulcanizate at a rate of 300 mm/min to measure a peel force per cord as an adhesive force (kg/cord).

TABLE 1

| | (parts by weight) |
|---|---|
| Natural rubber | 70 |
| Styrene-butadiene copolymer rubber | 30 |
| Carbon black | 40 |
| Stearic acid | 2 |
| Petroleum softening agent | 10 |
| Pine tar | 4 |
| Zinc white | 5 |
| N-phenyl-β-naphthylamine | 1.5 |
| 2-benzothiazolylsulfide | 0.75 |
| Diphenyl guanidine | 0.75 |
| Sulfur | 3.5 |

4) Test for the strength in rubber after vulcanization

The dipped cords were embedded in the unvulcanized rubber composition having the compounding recipe of Table 1 and vulcanized at 153° C. for 40 minutes while holding at constant length state by fixing both ends of the cord. After cooling in air at the constant length state, the cords surrounded by rubber were cut out from the vulcanizate by scissors in order to avoid the fluff in the peeling of the cord and then the remaining rubber was removed as far as possible. Thereafter, the strength at breakage was measured with respect to the cord at a rubber coated state.

5) Retention of strength after fatigue test

The cords after the treatment with adhesive were aligned side by side at an end count of 50 cords/5 cm in case of 1890 d/2 or an end count of 60 cords/5 cm in case of 1260 d/2 and sandwiched between two sheets of 0.4 mm made from the same unvulcanized rubber composition as in the above adhesion test to prepare a rubber topping sheet of 5 cm width×60 cm length. An unvulcanized rubber sheet of 3 mm in thickness was sandwiched between the above two topping sheets, which was sandwiched between two unvulcanized rubber sheets so as to provide a total thickness of 15 mm and vulcanized at 145° C. for 40 minutes under a pressure of 20 kg/cm$^2$ at a constant length state of fixing both ends of the cords to prepare a sample for testing a resistance to flexing fatigue. Then, the sample was extended about a pulley of 60 mm in diameter and repeatedly flexed 5000 times every one minute at an ambient temperature of 120° C. under a load of 150 kg applied to each end of the sample. After the flexing of 1,000,000 times, the sample was taken out from the pulley and then the polyamide fiber cord was taken out from the cord layer located at the side contacting with the pulley (a side subjected to repetitive compressive strain) among two polyamide fiber cord layers. After the strength at breakage of the cord was measured, the fatigue resistance of the cord was indicated by a retention (%) of the measured value to the strength of the new cord before the fatigue test.

TABLE 2(a)

| | Comparative Example 1 | Comparative Example 2 | Example 1 | Example 2 | Example 3 | Example 4 | Comparative Example 3 | Example 5 | Comparative Example 4 | Example 6 | Example 7 |
|---|---|---|---|---|---|---|---|---|---|---|---|
| Kind of polyamide fiber used Fiber tenacity (g/d) | super-high tenacity (iii) 12.2 | super-high tenacity (iii) 12.2 | super-high tenacity (iii) 12.2 | super-high tenacity (iii) 12.2 | high-tenacity (ii) 10.2 | high-tenacity (ii) 10.2 | conventional (i) 9.5 | super-high tenacity (iv) 13.0 | super-high tenacity (iii) 12.2 | super-high tenacity (iii) 12.2 | super-high tenacity (iii) 12.2 |
| Cord structure | 1890d/2 | 1890d/2 | 1890d/2 | 1890d/2 | 1890d/2 | 1890d/2 | 1890d/2 | 1260d/2 | 1890d/2 | 1890d/2 | 1890d/2 |
| Raw cord strength (kg) | 41.0 | 41.0 | 41.0 | 41.0 | 35.8 | 35.8 | 33.2 | 28.9 | 41.0 | 41.0 | 41.0 |
| Treating step with adhesive solution | FIG. 1 | FIG. 2 | FIG. 1 | FIG. 1 | FIG. 1 | FIG. 1 | FIG. 1 | FIG. 1 | FIG. 1 | FIG. 1 | FIG. 1 |
| Tension in immersion of adhesive solution (g/d) | 0.1 | 1.0 | 0.1 | 0.2 | 0.1 | 0.1 | 0.1 | 0.1 | 0.1 | 0.1 | 0.1 |
| Recipe of adhesive solution | | | | | | | | | | | |
| resorcinol (g) | 19.0 | 19.0 | 17.0 | 15.8 | 17.0 | 12.6 | 19.0 | 17.0 | — | — | 13.4 |
| formaldehyde (37% aqueous solution) (g) | 29.0 | 29.0 | 20.0 | 20.3 | 20.0 | 16.7 | 29.0 | 20.0 | 28.5 | 7.0 | 16.1 |
| NaOH (10% aqueous solution) (g) | 21.0 | 21.0 | 6.0 | 6.9 | 6.0 | 2.7 | 21.0 | 6.0 | 11.2 | 5.8 | 5.2 |
| $NH_3$ (28% aqueous solution) (g) | — | — | 2.0 | 1.0 | 2.0 | 0 | — | 2.0 | 30.9 | 2.5 | 0 |
| soft water (g) | 536 | 536 | 554.8 | 646 | 554.8 | 640.6 | 536 | 554.8 | 519.7 | 543.7 | 609.8 |
| VP latex (40%) (g) | 400 | 400 | 200 | 146 | 200 | 226.7 | 300 | 200 | 69 | 270 | 183.9 |
| SBR latex (40%) (g) | 0 | 0 | 100 | 55 | 100 | 0 | 100 | 100 | 275.8 | — | 147.1 |
| NR latex (60%) (g) | — | — | 100 | 110 | 100 | 100.7 | — | 100 | — | 90 | 124.5 |
| others (g) | | | | | | | | | (*1) 64.9 | (*1) 40 | |
| total (g) | 1000 | 1000 | 1000 | 1000 | 1000 | 1000 | 1000 | 1000 | 1000 | 1000 | 1000 |

(*1) Novolac RF resin of precondensation type (made by Hodogaya Kagaku K.K., trade name Adher RF 43%): calculated as a reaction product with R:F = 1:1

TABLE 2(b)

| | Comparative Example 1 | Comparative Example 2 | Example 1 | Example 2 | Example 3 | Example 4 | Comparative Example 3 | Example 5 | Comparative Example 4 | Example 6 | Example 7 |
|---|---|---|---|---|---|---|---|---|---|---|---|
| Recipe of adhesive solution | | | | | | | | | | | |
| R/F (molar ratio) | 1/2.07 | 1/2.07 | 1/1.60 | 1/1.74 | 1/1.60 | 1/1.80 | 1/2.07 | 1/1.60 | 1/2.76 | 1/1.70 | 1/1.63 |
| RF/L (weight ratio of solid content) | 1/5.38 | 1/5.38 | 1/7.38 | 1/6.26 | 1/7.38 | 1/8.05 | 1/5.38 | 1/7.38 | 1/3.59 | 1/8.19 | 1/7.6 |
| S (% by weight of solid content) | 1.09 | 1.09 | 0.29 | 0.41 | 0.29 | 0.16 | 1.09 | 0.29 | 0.60 | 0.32 | 0.31 |
| A (% by weight of solid content) | 0 | 0 | 0.27 | 0.17 | 0.27 | 0 | 0 | 0.27 | 4.65 | 0.38 | 0 |
| A + S (% by weight of solid content) | 1.09 | 1.09 | 0.56 | 0.58 | 0.56 | 0.16 | 1.09 | 0.56 | 5.25 | 0.70 | 0.31 |
| C (% by weight of total solid content) | 19.2 | 19.2 | 20.6 | 16.9 | 20.6 | 17.0 | 19.2 | 20.6 | 18.6 | 18.3 | 16.7 |
| a (VP latex percentage) (%) | 100 | 100 | 44.4 | 39.7 | 44.4 | 60 | 75 | 44.4 | 20 | 66.7 | 50 |
| b (SBR latex percentage) (%) | 0 | 0 | 22.2 | 15.1 | 22.2 | 0 | 25 | 22.2 | 80 | 0 | 40 |
| c (NR latex percentage) (%) | 0 | 0 | 33.3 | 45.2 | 33.3 | 40 | 0 | 33.3 | 0 | 33.3 | 10 |
| Strength of dipped cord (kg) | 33.7 | 41.1 | 41.4 | 40.6 | 36.2 | 35.4 | 32.4 | 29.3 | 36.7 | 41.7 | 40.8 |
| Retention of strength in dipping (%) | 82.2 | 100.2 | 101.0 | 99.0 | 101.1 | 98.9 | 97.6 | 101.4 | 89.5 | 101.7 | 99.5 |
| Strength at breakage in rubber after vulcanization (kg) | | 38.1 | 41.2 | 40.8 | 35.8 | 35.4 | 31.3 | 28.9 | | 41.4 | 38.3 |
| Tenacity in rubber after vulcanization (g/d) | | 9.8 | 10.6 | 10.4 | 9.1 | 8.9 | 7.9 | 11.0 | | 10.6 | 9.9 |
| Retention of strength in vulcanization (%) | | 92.7 | 99.5 | 100.5 | 98.9 | 100 | 96.6 | 98.6 | | 99.3 | 93.9 |
| Adhesive force (kg/cord) | 2.9 | 2.1 | 3.1 | 2.8 | 3.2 | 2.9 | 2.9 | 3.1 | 2.5 | 2.9 | 3.0 |
| Retention of strength after fatigue test (%) | | 73 | 95 | 94 | 96 | 96 | | 94 | | 93 | 92 |
| Swelling ratio × (%) | 106.4 | 107.0 | 154.9 | 125.6 | 145.8 | 193.4 | 105.4 | 165.6 | 115.1 | 130.9 | 124.6 |

In Comparative Example 1 of Table 2, the super-high tenacity nylon-6,6 cords were treated with the adhesive of the usual RFL recipe having a swelling ratio outside the range defined in the invention according to the conventional treatment step as shown in FIG. 1, so that the retention of strength in the dipping is as considerably low as 82.2%.

In Comparative Example 2, the same raw cords were passed through the preheating zone under tension as shown in FIG. 2 and then immersed in the adhesive solution under a high tension, so that the adhesive solution was not impregnated in the inside of the cord and the retention of strength in the dipping was high. However, the strength largely lowered by repetitive flexing in the fatigue test. This was confirmed to result from the fact that the bare filaments were contacted with each other at the intersecting face of the layer twisted structure to cause abrasion fatigue as observed in detail after the fatigue test of the cord.

In Examples 1 and 2, RFL dipped resin had a swelling ratio within the range defined in the invention and RFL adhesive solution had the recipe defined in the invention, so that the adhesive layer was soft and the retention of strength in the dipping was high though the cords were treated at the conventional adhesive treating step as shown in FIG. 1. Furthermore, the strength in the vulcanization was retained at a high value. Moreover, tension in the immersion of the adhesive solution was low in Examples 1 and 2, so that the solution was sufficiently impregnated into the inside of the cord to cover and protect the surfaces of the filaments at the intersecting face of the layer twisted structure with the solid of the adhesive and, therefore, the retention of strength in the fatigue test was very good. That is, it was confirmed that the two problems of lowering of the strength in the dipping and vulcanization and fatigue under low compression are simultaneously solved.

In Examples 3 and 4, high-strength nylon-6,6 cords having a yarn tenacity of 10.2 were used and the RFL dipped resin had the swelling ratio defined in the invention as well as the adhesive solution had the recipe defined in the invention, so that the retention of strength and fatigue resistance were established simultaneously.

On the other hand, Comparative Example 3 used the conventional strength nylon-6,6 cords and conventional RFL recipe having usual swelling ratio, so that even when the cord was subjected to the usual adhesive treatment as shown in FIG. 1, the lowering of the strength was small. Moreover, the tenacity in rubber after the vulcanization was 7.9.

In Example 5, the cords were made from super-high tenacity nylon-6 and the RFL resin had the swelling ratio defined in the invention and the adhesive solution had the recipe defined in the invention, so that they showed good strength retention in the dipping and vulcanization and the fatigue resistance.

In Comparative Example 4, novolac RF resin of precondensation type was used, but the swelling ratio was outside the range defined in the invention, so that the hardness of the RPL layer became too hard and the lowering of strength in the dipping and vulcanization was large and hence the strength inherent to the cord could not be developed.

In Example 6, novolac RF resin of precondensation type was used and also the swelling ratio and recipe of the adhesive solution were within the ranges defined in the invention, so that very good results were obtained.

In Example 7, the cords were made from super-high tenacity nylon-6,6 and the RFL resin had the swelling ratio defined in the invention, so that good results were obtained, even though the adhesive solution was outside the ranges defined the second aspect of the invention. As seen from the data of Table 2, the retention of strength in Examples 1–6 is excellent as compared with that of Example 7 because the RFL adhesive solutions of Examples 1–6 simultaneously satisfy the swelling ratio defined in the first aspect of the invention and the recipe defined in the second aspect of the invention.

As mentioned above, according to the invention, conflicting problems such as the lowering of strength in the treatment with adhesive and the vulcanization and the lowering of fatigue resistance due to repetitive compressive strain, which could not simultaneously be solved in the high-tenacity polyamide fiber cord, can simultaneously be solved by controlling the swelling ratio to a proper range, so that polyamide fiber cords for rubber reinforcement having an improved adhesion property to rubber can be provided. Therefore, when using the polyamide fiber cords according to the invention, the amount of reinforcing material is decreased by reducing the lamination number of reinforcing layers, the end count or the like, whereby the weight reduction, low fuel consumption, resource-saving, cost reduction, improvement of productivity and the like in the tire or the like can be attained.

What is claimed is:

1. A treated polyamide fiber cord for rubber reinforcement obtained by applying a solution of resorcinol-formaldehyde-rubber latex adhesive to a high tenacity polyamide fiber cord having a denier per filament of 1.5–10 and a yarn tenacity of at least 10.0 g/d, in which the resulting treated polyamide fiber cord embedded in vulcanized rubber has a tenacity of at least 8.5 g/d and the resorcinol-formaldehyde rubber latex adhesive impregnated in the cord has a swelling ratio X in dimethyl sulfoxide of 122% to 340%, and the solution of resorcinol-formaldehyde rubber latex adhesive satisfies the following:

(a) R/F is from 1/2.3 to 1/1.1, (b) RF/L is from 1/10 to 1/4, (c) S is from 0.05 to 0.8, (d) A is from 0 to 0.5, (e) S+A is from 0.05 to 0.8, (f) C is from 10 to 24, (g) a is from 10 to 80, (h) b is from 0 to 7, and (i) c is from 20 to 60;

wherein R/F is a molar ratio of resorcinol/formaldehyde, RF/L is a weight ratio of the total amount of resorcinol and formaldehyde to the total amount, as solid content, of rubber latex, S is a weight ratio of alkali metal hydroxide to the total solid content of resorcinol-formaldehyde rubber latex adhesive solution in %, A is a weight ratio, as $NH_4OH$, of an aqueous solution of $NH_3$ to the total solid content of resorcinol-formaldehyde rubber latex adhesive solution in %, C is a weight ratio of the total content of resorcinol-formaldehyde rubber latex adhesive solution in %, a is a weight ratio, as solid content, of a vinyl pyridine (VP) latex to the total solid content of all of VP latex, styrene-butadiene rubber (SBR) latex and at least one of natural rubber (NR) and isoprene rubber (IR) lattices in %, b is a weight ratio, as solid content, of SBR latex to the total solid content of all lattices in %, and c is a weight ratio, as solid content, of at least one of IR and NR lattices to the total solid content of all lattices in %.

2. The treated polyamide fiber cord according to claim 1, wherein the solution of resorcinol-formaldehyde rubber latex adhesive satisfies the following:

(a) R/F is from 1/2.0 to 1/1.3,
(b) RF/L is from 1/8 to 1/5,
(c) S is from 0.1 to 0.5,
(d) A is from 0 to 0.3,
(e) S+A is from 0.1 to 0.5,
(f) C is from 14 to 22,
(g) a is from 30 to 60,
(h) b is from 10 to 50, and
(i) c is from 25 to 50;

wherein R/F is a molar ratio of resorcinol/formaldehyde, RF/L is a weight ratio of the total amount of resorcinol and formaldehyde to the total amount, as solid content, of rubber latex, S is a weight ratio of alkali metal hydroxide to the total solid content of resorcinol-formaldehyde rubber latex adhesive solution in %, A is a weight ratio, as $NH_4OH$, of an aqueous solution of $NH_3$ to the total solid content of resorcinol-formaldehyde rubber latex adhesive solution in %, C is a weight ratio of the total solid content of resorcinol-formaldehyde rubber latex adhesive solution in %, a is a weight ratio, as solid content, of vinyl pyridine (VP) latex to the total solid content of all of VP latex, styrene-butadiene rubber (SBR) latex and at least one of natural rubber (NR) and isoprene rubber (IR) lattices in %, b is a weight ratio, as solid content, of SBR latex to the total solid content of all lattices in %, and c is a weight ratio, as solid content, of at least one of IR and NR lattices to the total solid content of all lattices in %.

3. The treated polyamide fiber cord according to claim 1, wherein the denier per filament of the cord is within the range of 3–8.

4. The treated polyamide fiber cord according to claim 1, wherein the polyamide fiber cord comprises nylon-6,6 fiber.

* * * * *